June 28, 1927.

G. C. FRANTZ

GRADE MEASURING DEVICE

Filed Jan. 2, 1926

1,633,854

3 Sheets-Sheet 1

Witnesses:
Walter Chiou
George A. Gruss

Inventor
Grover C. Frantz
Joshua R. H. Potts
His Attorney by

June 28, 1927.
G. C. FRANTZ
GRADE MEASURING DEVICE
Filed Jan. 2, 1926
1,633,854
3 Sheets-Sheet 2
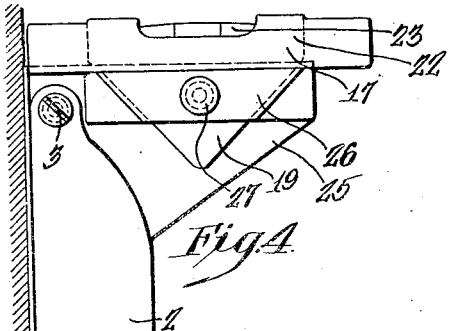
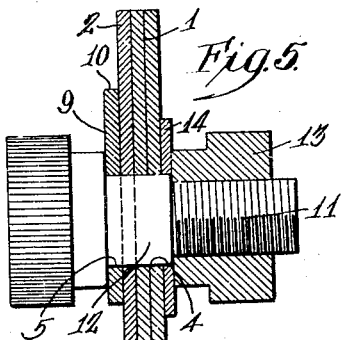
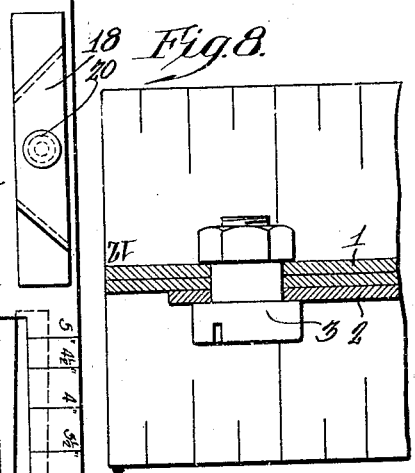
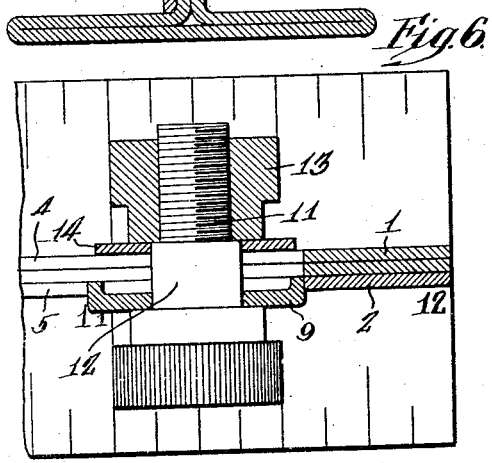
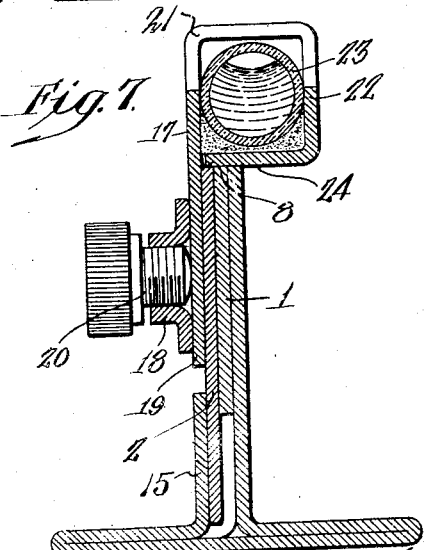
Inventor
Grover C. Frantz
by Joshua R. H. Potts
his Attorney June 28, 1927.
G. C. FRANTZ
GRADE MEASURING DEVICE
Filed Jan. 2, 1926
1,633,854
3 Sheets-Sheet 3
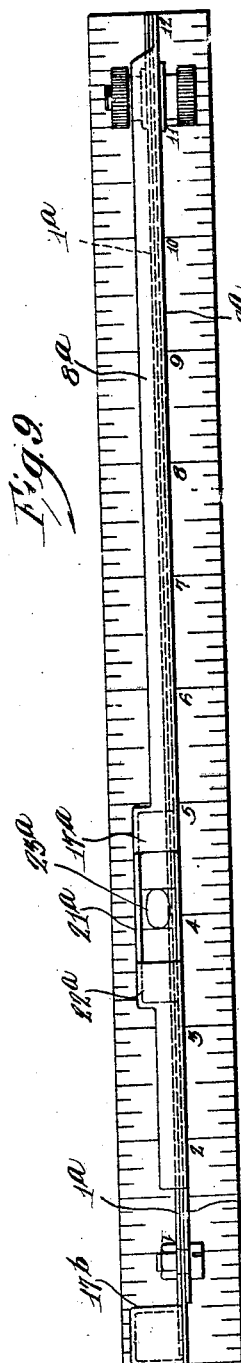
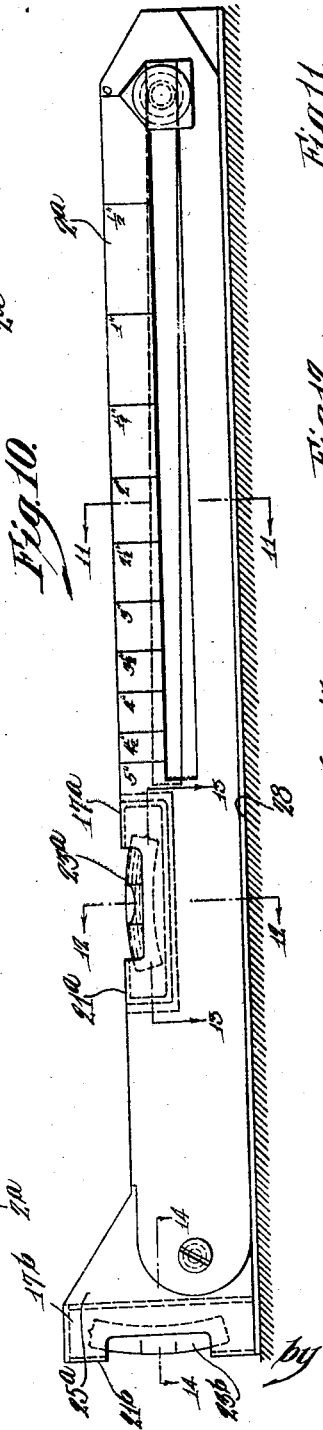
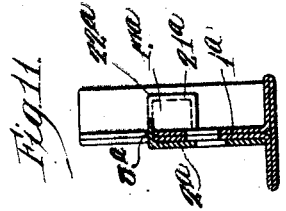
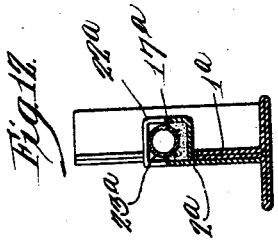
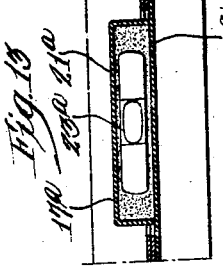
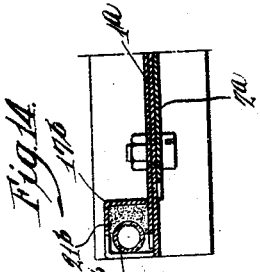

Patented June 28, 1927.

1,633,854

UNITED STATES PATENT OFFICE.

GROVER C. FRANTZ, OF HARRISBURG, PENNSYLVANIA, ASSIGNOR TO MODERN UTILITIES COMPANY, OF HARRISBURG, PENNSYLVANIA.

GRADE-MEASURING DEVICE.

Application filed January 2, 1926. Serial No. 78,794.

This invention relates to grade measuring devices adapted for use in ascertaining the grade of sloping pipes, highways, railroad tracks or any other slanting surface.

The customary way of quickly measuring a grade for a sloping part, especially a pipe in a building, is by the use of a spirit level and a scale. One end of the level is placed on the pipe and a scale at the other end of the level measures the distance from the level to the sloping pipe. From such measurements, the workman approximates the grade of slope. This crude method is objectionable because the grade measured is inaccurate and does not comply with the contractor's specifications.

The objects of my invention are to provide a simple and rugged grade measuring device with which the grade of a sloping part may be quickly measured and which may be readily used for leveling and plumbing purposes.

Figure 1:
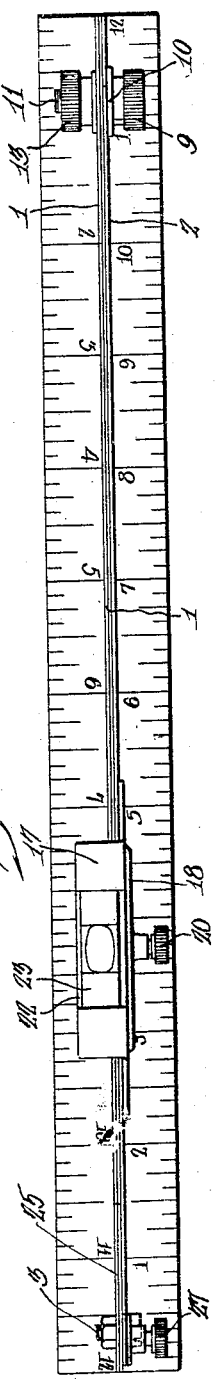
Figure 2:
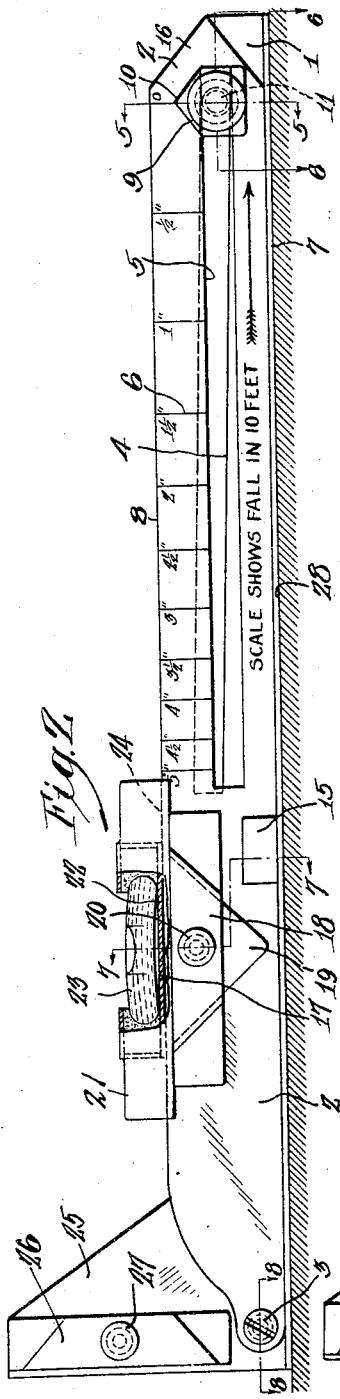
Figure 3:
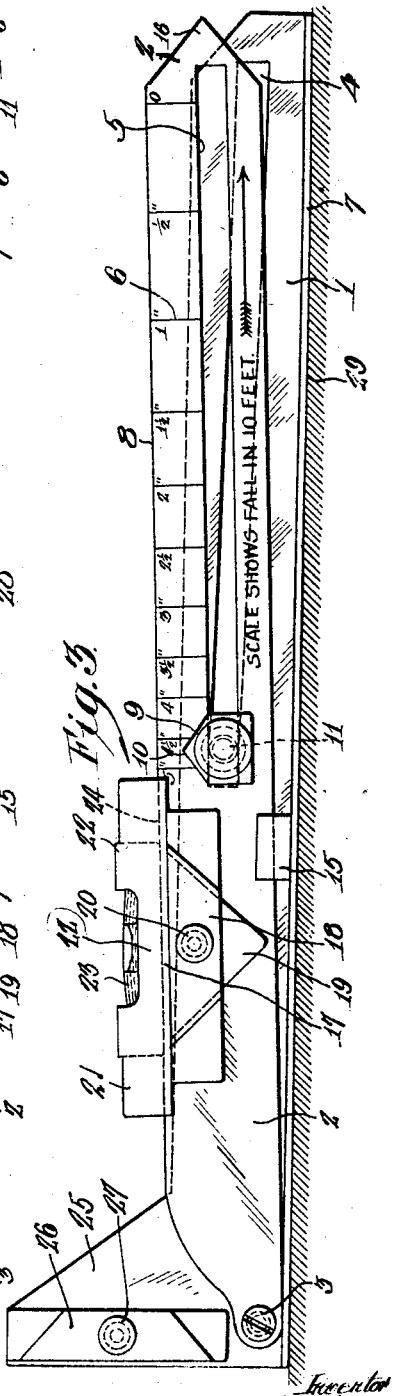

These objects, and other advantageous ends which will be described hereinafter, I attain in the following manner, reference being had to the accompanying drawings in which Figure 1 is a plan view of a grade measuring device made in accordance with my invention, Figure 2 a side elevation of the device shown in Figure 1, illustrating the same as used for leveling purposes, Figure 3 a view similar to Figure 2 illustrating the device as used for determining the grade of a sloping part, Figure 4 a view similar to Figure 2 illustrating the device as used for plumbing purposes, Figure 5 an enlarged section on line 5—5 of Figure 2, Figure 6 an enlarged section on line 6—6 of Figure 2, Figure 7 an enlarged section on line 7—7 of Figure 2, Figure 8 an enlarged section on line 8—8 of Figure 2, Figure 9 a plan view of a modified form of grade measuring device, Figure 10 a side elevation of the device shown in Figure 9, Figures 11, 12, 13 and 14 sections on lines 11—11, 12—12, 13—13 and 14—14 respectively of Figure 10.

Referring to the drawings, 1 indicates a base of inverted T-cross section preferably formed from sheet metal, and 2 a leveling bar pivoted to the base at 3. Base 1 has a slot 4, and bar 2 has a slot 5 and a scale 6 adjacent the slot. For angularly adjusting bar 2 on base 1, one of the slots is inclined relatively to the other. Slot 4 is preferably inclined relatively to the under side 7 of base 1 and slot 5 is parallel to the upper edge 8 of bar 2 so that sufficient area is left above slot 5 to mark the scale 6 thereon. The scale is graduated to indicate the grade in inches the fall per ten feet run, but may be graduated to indicate the grades in percent as used in highway and railroad construction work. A grade indicator 9 passes through slots 4 and 5 and is adapted to be slid therein to adjust bar 2 relatively to base 1. The indicator may include a pointer 10 slidable in slot 5, a bolt 11 passing through the pointer and through the slots and having a cylindrical part 12 contacting with the walls of the slots, and a nut 13 threaded on the bolt for securing the pointer in position. A washer 14, preferably of fiber, is interposed between nut 13 and the side wall of base 1 to frictionally hold the indicator in adjusted position. The cylindrical part 12, being in contact with the walls of the slots, will, when slid therein, swing bar 2 on its pivot without binding in the slots or producing appreciable play between bar 2 and base 1. In order to keep the bar 2 alongside the base 1 during adjustment, a guide 15 is formed by striking out a rectangular section of the sheet from which the base is being formed and bending same upwardly so that it will engage the outer side of the bar when the device is assembled, as indicated in Figure 7. The free end 16 of the bar 2 is preferably pointed to indicate the direction of the downward slope of the part whose grade is being measured.

The true grade measuring position of the device is ascertained by a leveling unit 17 which may be detachably connected to bar 2 as shown in Figures 1–8. The detachable connection may be in the form of a socket 18 into which a part 19 of the leveling unit 17 fits. This part is fastened in the socket by a set screw 20. The leveling unit, when of the detachable type, may consist of a plate 21 formed to have the part 19 and a box 22 in which a leveling glass 23 is properly cemented. The box is made so that its bottom wall 24 will rest on the top edge of the bar 2 as shown in Figure 2. This insures that the leveling unit will, when attached to bar 2, always be parallel to the bar.

For plumbing pipes, walls or other vertical surfaces, I provide an extension 25 on the base and a socket 26 similar to socket 18 on the extension. This socket has a set screw 27 for fastening the part 19 in the socket when the leveling unit is used in socket 26.

In Figures 9-14, I have shown a modified form in which a leveling bar 2$^a$ is bent at its upper edge to form a reinforcing rib 8$^a$ which stiffens the bar and overlies the upright part of base 1$^a$ to prevent foreign matter from falling between the bar and the base. A leveling unit 17$^a$, similar to the leveling unit 17, is made by cementing a leveling glass 23$^a$ into a box 22$^a$ formed from a plate 21$^a$, integral with rib 8$^a$ and having an opening at one side and a tab on each end, by bending the plate downwardly and then forwardly, thus forming a square with the body of the leveling bar forming the fourth side. The tabs are then bent upwardly closing the ends of the box. A similar leveling unit 17$^b$ is made in a like manner on extension 25$^a$ of base 1$^a$, and I have therefore given corresponding parts similar reference characters with the exponent "b."

To use the device as a level, it is adjusted to be as shown in Figure 2. It is then placed on a surface 28 to be leveled and used in the usual manner to ascertain whether the surface is level.

To measure a grade, having for example a fall of 1" per 10', for an inclined part 29 such as a pipe, indicator 9 is slid in slots 4 and 5 to bring pointer 10 on the graduation marked 1" on scale 6. The device is then placed on part 29 and the part raised or lowered until the leveling unit indicates the true position.

When plumbing a vertical surface 30 of a pipe or a wall, leveling unit 17 is removed from socket 18 and attached to socket 25. The under surface 7 of base 1 is then placed against surface 30, and the pipe or wall plumbed in the usual manner.

It is thus seen that the grading device above described may be used to ascertain the grade of any sloping part, that it may be readily used for leveling and plumbing purposes, and that it may be quickly and accurately adjusted and the scale easily read.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A grade indicator including an elongated base of inverted T-cross section having a slot extending longitudinally thereof in the vertical part thereof; a leveling bar pivoted to the base, having a slot inclined relatively to the slot in the base, and means slidable in the slots for angularly adjusting the base relatively to the bar.

2. A grade indicator including an elongated base of inverted T-cross section having an inclined slot extending longitudinally thereof in the vertical part thereof; a leveling bar rectangular in cross section pivoted to the base, having a slot substantially parallel to its longitudinal edges and graduations adjacent to the slot, and means slidable in the slots for angularly adjusting the base relatively to the bar.

3. A grade indicator including a base of inverted T-cross section having a slot in the vertical part of the base; a leveling bar pivoted to the base and having a slot inclined relatively to the slot of the base and having graduations adjacent the slot; a graduation pointer slidable on the leveling bar, and means passing through the pointer and slidable in the slots for angularly adjusting the base relatively to the bar.

4. A grade indicator including an elongated base of inverted T cross-section having an inclined slot extending longitudinally thereof in the vertical part thereof; a leveling bar rectangular in cross section pivoted to the base and having a slot parallel with its longitudinal edges, and means including a cylindrical element slidable in the slots and contacting with their walls for angularly adjusting the base relatively to the bar.

5. A grade indicator including a base of inverted T-cross section having a slot in the vertical part of the base; a leveling bar pivoted to the base, having a slot inclined relatively to the slot of the base, and graduations adjacent the slot; a graduation pointer slidable on the leveling bar; a cylindrical element secured to the pointer and passing through the slot of the base and of the leveling bar, and means on the element for securing the pointer in position.

6. A grade indicator including a base of inverted T-cross section having a slot in the vertical part of the base; a leveling bar pivoted to the base, having a slot inclined relatively to the slot of the base, and graduations adjacent the slot; a graduation pointer slidable on the leveling bar; a bolt passing through the pointer and the slots and having a cylindrical part contacting with the walls of the slots, and means on the bolt for securing the pointer in position.

7. A grade indicator including a base of inverted T-cross section having a slot in the vertical part of the base; a bar pivoted to the base, having a slot inclined relatively to the slot of the base; means slidable in the slots for angularly adjusting the base relatively to the bar, and a leveling unit attached to the bar.

8. A grade indicator including a base of inverted T-cross section having a slot in the vertical part of the base and an extension at one end; a bar pivoted to the base adjacent the extension and having a slot inclined relatively to the slot of the base; means slidable in the slots for angularly adjusting the base relatively to the bar; a leveling unit attached to the bar, and a plumbing unit attached in the extension.

9. A grade indicator including a base of inverted T-cross section having a slot in the vertical part of the base; a leveling bar pivoted to the base, having a slot inclined relatively to the slot of the base; means slidable in the slots for angularly adjusting the base relatively to the bar, and means on the base for guiding the bar during the adjustment.

10. A grade indicator including a base of inverted T-cross section having a slot in the vertical part of the base; a leveling bar pivoted to the base, having a slot inclined relatively to the slot of the base; means slidable in the slots for angularly adjusting the base relatively to the bar, and a guide fixed with the base and disposed adjacent the bar for guiding the same during angular adjustment.

11. A grade indicator including a base of inverted T-cross section having a slot in the vertical part of the base; a leveling member having one end pivoted to the base and its other end pointed, and a slot inclined relatively to the slot of the base, and means slidable in the slots for angularly adjusting the base relatively to the bar.

12. A grade indicator having a base of inverted T cross-section having a slot in the vertical part of the base; a leveling bar pivoted to the base and having a slot inclined relatively to the slot in the base; a leveling unit on the bar; an extension on the base; a second leveling unit in the extension disposed substantially at right angles to the base, and means slidable in the slots for angularly adjusting the bar relatively to the base.

13. A grade indicator including a base of inverted T-cross section having a slot in the vertical part of the base; a leveling bar pivoted to the base having a slot inclined relatively to the slot in the base; a rib extending from the bar above the upper edge of the base, and means slidable in the slots for angularly adjusting the bar relatively to the base.

14. A grade indicator including a base of inverted T-cross section having a slot; a leveling bar pivoted to the base having a slot inclined relatively to the slot in the base; a rib extending from the bar above the upper edge of the base; a leveling unit on the bar; an extension on the base; a second leveling unit in the extension and disposed substantially at right angles to the base, and means slidable in the slots for angularly adjusting the bar relatively to the base.

In testimony whereof I have signed my name to this specification.

GROVER C. FRANTZ.